Aug. 9, 1966  R. J. NOCERA  3,265,368
BAFFLE FOR MIXING DEVICES
Filed April 10, 1964

INVENTOR.
RAY J NOCERA
BY
ATTORNEY

United States Patent Office 3,265,368
Patented August 9, 1966

3,265,368
BAFFLE FOR MIXING DEVICES
Ray J. Nocera, Perry, N.Y., assignor to Pfaudler Permutit Inc., Rochester, N.Y., a corporation of New York
Filed Apr. 10, 1964, Ser. No. 359,556
4 Claims. (Cl. 259—108)

This invention relates to baffles for use in connection with agitating or mixing devices and more particularly relates to glass-coated baffles.

Devices having a driven shaft that extends into a fluid-containing vessel are commonly used to mix or pump large amounts of fluid. In such applications it is common to include within the reactor vessel one or more baffles to control vortexing and to direct the fluid toward the agitator and away from the container walls.

Baffles are designed to be compatible with the particular agitator and the particular fluids to be processed and may serve different functions in particular applications. In the past, specific baffles have been designed to promote emulsion, to decrease surface disturbances, and to minimize foaming. In addition, a multitude of baffle designs presently exist to aid mixing, heat transformation, suspension, gas absorption, etc. However, a baffle is no more than a flow deflector, designed to break up the rotary swirl produced by a rotating mixing device. Therefore the subject baffle is suitable for any of the above enumerated functions.

The most commonly used baffle is the sidewall baffle which consists of one or more projections fixed to the inner wall of a vessel and extending into the void at an angle to the flow path of a liquid.

Another prior-art baffle is the "beaver tail" baffle, which is a generally vertically positioned member (detachably suspended within the liquid) having a flat or paddle-shaped configuration at its lowermost portion.

Yet another baffle is the "finger baffle," which is a generally vertically positioned member having a plurality of elements or fingers disposed laterally with respect to the vertical members at angles calculated to perform a particular function.

In the chemical and pharmaceutical industries glass-coated metals are widely used as construction materials for applications that require a combination of high strength, exceptional corrosion resistance, and anti-adherence characteristics. In such applications it is desirable to glass coat the baffles as well as the containers; however, serious problems arise that are not present in metallic systems. These problems include (a) the tendency of glass coatings upon narrow edges to crack, (b) the advisability of not disturbing the integrity of the vessel lining, (c) the brittleness of the glass when subjected to flexing.

Although sidewall baffles are without question most efficient, and are widely used in metal vessels, these baffles extend from the wall lining and include narrow edges. It is thus apparent that two of the problems mentioned above are presented. The attaching of these baffles to the wall of a glass-lined vessel disturbs the lining and thus forces the fabricator to face possible exposure of the metal to the corrosive medium. Furthermore, the narrow edges of the sidewall baffle are subject to cracking and crazing.

In view of the above, the approach in the enameling art has been to suspend the baffles from a nozzle in the head of the vessel. Although this approach eliminates the disturbance of the vessel lining and simplifies fabrication, additional problems are presented. Namely, the baffle, hanging from the head of the vessel and unsupported at the bottom, is subjected to cantilever forces by the motion of the swirling liquid and thus must be designed with a certain amount of rigidity. Furthermore, the most effective and consistent baffling is achieved by maintaining a certain relationship between the width of the baffles and the size of the vessel in which they are used. It follows that in an ideal situation the larger the vessel, the wider the baffle should be. However, as the width increases the forces exerted upon the surface will tend to twist the baffle, thus causing it to flex. This flexing will, in turn, cause the glass lining to crack and craze. It is thus apparent that the use of an overhung baffle has not completely solved the peculiar problems inherent in glass-coating a baffle. Therefore, the object of this invention is to provide a baffle that is easily fabricated and does not disturb the integrity of the vessel lining, yet is sufficiently rigid for use in a turbulent fluid at an effective width approaching the theoretically ideal width.

I have surprisingly found that the above difficulties are overcome and the objects of this invention achieved by employing a baffle comprising a plurality of rounded, laterally spaced members joined at their ends. The cross-sectional widths of the various sections of this baffle are relatively small, thus the problems associated with increasing width are minimized, yet the effective width of this baffle is the total width and thus permits dimensional scale-up in accordance with maximum efficiency even for the largest containers.

A baffle constructed according to this invention operates as efficiently as a solid baffle of similar outside configurations, but has the advantage of being easy to fabricate and to coat with glass. Furthermore, this baffle, by effectively dividing a circular flow pattern into several streams creates a turbulence that far exceeds that of its solid counterpart.

Moreover, baffles according to this invention require less material to provide a given effect and thus provide efficient and economical operation. This also facilitates the use of adjustable means for orientating the baffles to suit a particular medium or purpose.

The joined ends of the spaced members of this baffle impart a transverse rigidity to the baffle that protects the glass coating, and additionally aids in creating turbulence.

Other objects and advantages of this invention will be particularly set forth in the claims and will be apparent from the following description, in which:

Figure 1:
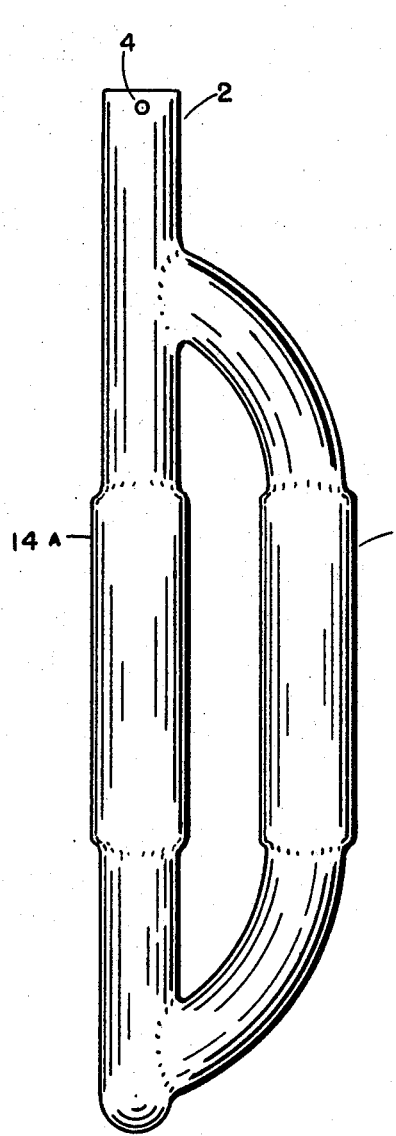
FIGURE 1 is an elevational view of a baffle according to the present invention.
Figure 3:
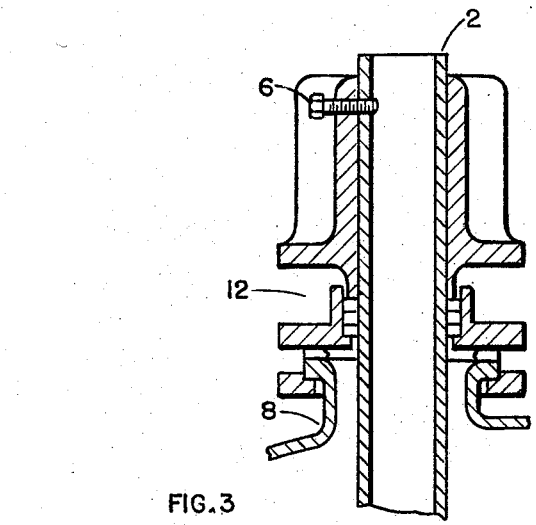
FIGURE 3 is a fragmentary elevational cross-sectional view showing the mounting of a baffle in a vessel.
Figure 2:
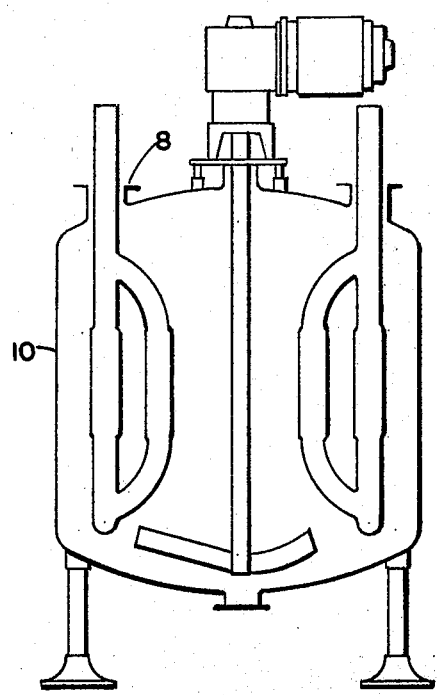
FIGURE 2 is an elevational view of a vessel containing baffles according to the present invention.

Referring to the drawings, a preferred embodiment of a baffle according to this invention is shown. This embodiment comprises two spaced apart members that form a substantially D-shaped portion and a cylindrical mounting portion for suspending the baffle within the mixing container. Although no details of such devices are disclosed in this application, it should be understood that the provision of means in cooperation with the mounting means for adjusting the orientation of the baffle is within the purview of this disclosure.

The mounting portion is a substantially cylindrical member, designated 2 in the drawings and is provided with holes 4 adapted for the insertion of bolts 6 whereby the entire baffle may be secured to a nozzle 8 provided in the head of vessel 10. The mounting includes the provision of a stuffing box 12 or other suitable sealing means to insure integrity of the product and closure of the vessel.

The spaced members 14 are formed from sections of cylindrical metallic tubing. After formation of the D-shape, in the described embodiment, a portion of the tubing generally including the spaced apart substantially parallel portions of the "D" is partially flattened to provide a generally oval-shaped configuration.

When the baffle has been completely fabricated, one or more continuous layers of glass or vitreous enamel are applied to the surface to provide a smooth, corrosion resistant surface.

The preferred embodiment as illustrated in the drawings is a D-shaped configuration in which the parallel portions of the spaced members are flattened to form an oval-shaped section as shown by member 14a. However, since the avoidance of sharp corners is necessary to prevent the glassing difficulties discussed above, the edges should still remain rounded.

I have found a D-shaped configuration to be most advantageous, but in accordance with the basic objects of our invention, e.g. the achieving of maximum baffling width and improved baffling without sacrificing the structural strength of the glass coated baffle, it is not limited to a D-shaped configuration. Accordingly, the use of more than two spaced members joined at one end to a mounting member and at their other ends to each other is within the scope of my invention. Moreover, such joining may be directly or by means of a transverse member, as long as sharp angles and narrow edges are avoided.

In any mixing process an important factor that must be considered is power consumption. When baffles are absent or inadequate baffling is provided, rotary motion or swirl is set up. Less power is consumed under these conditions than is consumed when vertical currents are present. Therefore, to measure the effectiveness of a baffle, it is customary to observe its effect upon the power consumption. It is preferable to measure power consumption over an increasing range of power input. If sufficient power is applied swirl, vortex, and air entrapment can be obtained with the best of baffles. The more effective baffle will thus retard such effects at higher power inputs. In accord with the above, I have found that two D-baffles will absorb approximately 28% more horsepower than two finger baffles.

In addition to measurements of power input, the relative effectiveness of baffles is commonly determined by visual observation of the agitation effects. The flow pattern produced by two D-baffles exhibited a high velocity at the wall of the vessel, high turbulence behind the baffle and a powerful top-to-bottom turnover. Vortex control was excellent and agitation effect approached that of a four sidewall baffle system.

Tests conducted with a 44 inch Pfaudler impeller in a 1000 gallon tank of water using a 15 H.P. variable speed motor and two baffles mounted as illustrated in the accompanying drawings are shown in the following table.

TABLE I

| R.p.m. | Net Input H.P. for 2 Finger Baffles | Net Input H.P. for 2 "D" Baffles | Percent Increase in Power Over 2 Finger Baffles |
|---|---|---|---|
| 70 | 0.92 | 1.32 | 4.4 |
| 80 | 1.58 | 2.20 | 33.7 |
| 90 | 2.32 | 3.17 | 36.7 |
| 100 | 3.15 | 4.18 | 32.8 |
| 110 | 4.00 | 5.18 | 29.6 |
| 120 | 4.84 | 6.30 | 30.3 |

Additional tests were conducted with smaller vessels that substantiated the superior performance of the subject baffle.

Although I have not provided data detailing the dimensions of baffles according to my invention, such information is readily accessable to those skilled in the art. Typical applications are governed by the rule-of-thumb wherein 4 equally spaced baffles extending the full length of the vertical sides, each having a width ½ of the vessel diameter is considered standard. But such rules are arbitrary and generally the most efficient baffling for a given fluid is determined empirically.

Baffles according to this invention can be used as heat transfer surfaces, and can be used on existing vessels without vessel re-design. The glass coating permits effective baffling in highly corrosive mediums wherein it is not advisable to disturb the integrity of the tank lining. Although I have shown this baffle with impeller type agitation devices, it is not limited thereto and may be used with other devices such as turbines. The modification of the baffle elements for the inclusion of the thermometer wells and the like may be done in accordance with prior art practice.

The term glass coating as used herein includes glass or ceramic coatings, whether amorphous or devitrified.

Although the invention has been illustrated by a particular preferred embodiment, it is to be understood that such disclosure is intended to be illustrative, not limiting, and that various modifications that will become apparent to those skilled in the art are within the scope of this invention and the appended claims.

I claim:
1. In combination with a vessel having mixing means a baffle comprising,
  (a) a mounting member adjustably mounted outside said vessel and adapted for extending into said vessel
  (b) a plurality of rounded spaced members substantially parallel intermediate their ends, joined to said mounting member at one end and to each other at their opposite ends, and extending into the vessel, the portions of said baffle within the vessel being glass coated.

2. Apparatus according to claim 1 wherein said spaced members are in the same plane, the substantially parallel portions of said spaced members are oval shaped, and the major axes of said oval-shaped members are in the said plane.

3. Apparatus according to claim 1 comprising two spaced members joining said mounting member and each other to form a D-shaped member.

4. Apparatus according to claim 3 wherein said spaced members are in the same plane, the substantially parallel portions of said spaced members are oval shaped, and the major axes of said oval-shaped members are in the said plane.

References Cited by the Examiner

UNITED STATES PATENTS 3,063,684  11/1962  Hayashi _____ 259—10

FOREIGN PATENTS 204,684  8/1959  Austria.

WALTER A. SCHEEL, *Primary Examiner.*

R. W. JENKINS, *Assistant Examiner.*